United States Patent
Chaudhuri et al.

(10) Patent No.: US 9,979,442 B2
(45) Date of Patent: May 22, 2018

(54) METHODS AND SYSTEMS FOR DYNAMIC COMP-LINK MAINTENANCE

(71) Applicant: Wipro Limited, Bangalore (IN)

(72) Inventors: Saptarshi Chaudhuri, Bangalore (IN); Avijit Manna, Kolkata (IN); Shyam Sundar Pal, Kolkata (IN)

(73) Assignee: WIPRO LIMITED, Bangalore, Karnataka (IN)

( * ) Notice: Subject to any disclaimer, the term of this patent is extended or adjusted under 35 U.S.C. 154(b) by 144 days.

(21) Appl. No.: 15/063,853

(22) Filed: Mar. 8, 2016

(65) Prior Publication Data
US 2017/0214436 A1 Jul. 27, 2017

(30) Foreign Application Priority Data
Jan. 25, 2016 (IN) .............................. 201641002779

(51) Int. Cl.
*H04W 24/10* (2009.01)
*H04B 7/024* (2017.01)
(Continued)

(52) U.S. Cl.
CPC .......... *H04B 7/024* (2013.01); *H04J 11/0053* (2013.01); *H04W 24/10* (2013.01);
(Continued)

(58) Field of Classification Search
CPC ..... H04W 24/10; H04W 40/04; H04W 48/20; H04W 72/0406; H04B 7/024; H04J 11/0053
(Continued)

(56) References Cited

U.S. PATENT DOCUMENTS

2010/0271968 A1* 10/2010 Liu ..................... H04L 25/0202
370/252
2010/0303039 A1* 12/2010 Zhang .................. H04L 5/0035
370/331
(Continued)

OTHER PUBLICATIONS

Shengquian Han et al., "On the energy efficiency of base station sleeping with multicell cooperative transmission", *IEEE*, Sep. 11, 2011, pp. 1536-1540.
(Continued)

*Primary Examiner* — Afsar M Qureshi
(74) *Attorney, Agent, or Firm* — Finnegan, Henderson, Farabow, Garrett & Dunner LLP

(57) ABSTRACT

This disclosure relates generally to improving wireless data rates, and more particularly to methods and systems for dynamic CoMP-link maintenance. In one embodiment, a system may detect a trigger for coordinated multi-point link maintenance. Disclosed embodiments may also identify one or more potential changes to one or more coordinated multi-point links. Further, disclosed embodiments may estimate a coordinated multi-point link throughput based on the one or more potential changes to the one or more coordinated multi-point links. Additionally, disclosed embodiments may calculate one or more resource utilization metrics based on the one or more potential changes to the one or more coordinated multi-point links. Disclosed embodiments may determine whether to implement the one or more potential changes to the one or more coordinated multi-point links based on the estimated coordinated multi-point link throughput and the one or more resource utilization metrics.

20 Claims, 4 Drawing Sheets

(51) Int. Cl.
    *H04J 11/00*     (2006.01)
    *H04W 40/04*     (2009.01)
    *H04W 76/02*     (2009.01)
    *H04W 48/20*     (2009.01)

(52) U.S. Cl.
    CPC ......... *H04W 40/04* (2013.01); *H04W 76/025* (2013.01); *H04W 48/20* (2013.01); *Y02B 60/50* (2013.01)

(58) Field of Classification Search
    USPC ....................................................... 370/329
    See application file for complete search history.

(56) References Cited

U.S. PATENT DOCUMENTS

| | | | |
|---|---|---|---|
| 2013/0258890 A1* | 10/2013 | Li | H04W 24/02 370/252 |
| 2015/0063142 A1* | 3/2015 | Kim | H04B 7/024 370/252 |
| 2015/0319772 A1* | 11/2015 | Halabian | H04W 72/1273 370/329 |
| 2015/0349854 A1* | 12/2015 | Zhao | H04B 7/024 370/252 |
| 2017/0006491 A1* | 1/2017 | Chen | H04B 7/024 |
| 2017/0163393 A1* | 6/2017 | Sun | H04L 5/0035 |

OTHER PUBLICATIONS

Extended European Search Report from the European Patent Office in counterpart European Application No. 15159527.7 dated Jun. 20, 2017, 9 pages.

\* cited by examiner

US 9,979,442 B2

METHODS AND SYSTEMS FOR DYNAMIC COMP-LINK MAINTENANCE

PRIORITY CLAIM

This U.S. patent application claims priority under 35 U.S.C, § 119 to: India Application No. 201641002779, filed Jan. 25, 2016. The entire contents of the aforementioned application are incorporated herein by reference.

TECHNICAL FIELD

This disclosure relates generally to improving wireless data rates, and more particularly to methods and systems for dynamic CoMP-link maintenance.

BACKGROUND

The Third Generation Partnership Project (3GPP) has organized and developed long-term evolution (LTE) or "4G" standards for wireless cellular networks. As LTE protocols continue to evolve, 3GPP has introduced guidelines for coordinated multi point (CoMP) links. CoMP links may improve network performance on cell edges by establishing active back-up channels between a user equipment (UE) and a neighbor base station (NBS) and a serving base station (SBS), For example, a serving base station may select a neighbor base station from a CoMP set of base stations to establish an active back-up channel. The active back-up channel may provide additional network connectivity as user equipment, such as a cell phone, distances itself from the serving base station at the cell edge, As the serving base station signal dissipates, the neighbor base station may provide a supplementary coordinated link.

SUMMARY

Embodiments of the present disclosure present technological improvements as solutions to one or more of the above-mentioned technical problems recognized inventors in conventional systems. For example, embodiments may include systems, methods, and computer-readable media for dynamic CoMP-link maintenance. Disclosed embodiments may detect a trigger for coordinated multi-point link maintenance. Disclosed embodiments may also identify one or more potential changes to one or more coordinated multi-point links. Further, disclosed embodiments may estimate a coordinated multi-point link throughput based on the one or more potential changes to the one or more coordinated multi-point links. Additionally, disclosed embodiments may calculate one or more resource utilization metrics based on the one or more potential changes to the one or more coordinated multi-point links. Disclosed embodiments may determine whether to implement the one or more potential changes to the one or more coordinated multi-point links based on the estimated coordinated multi-point link throughput and the one or more resource utilization metrics.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
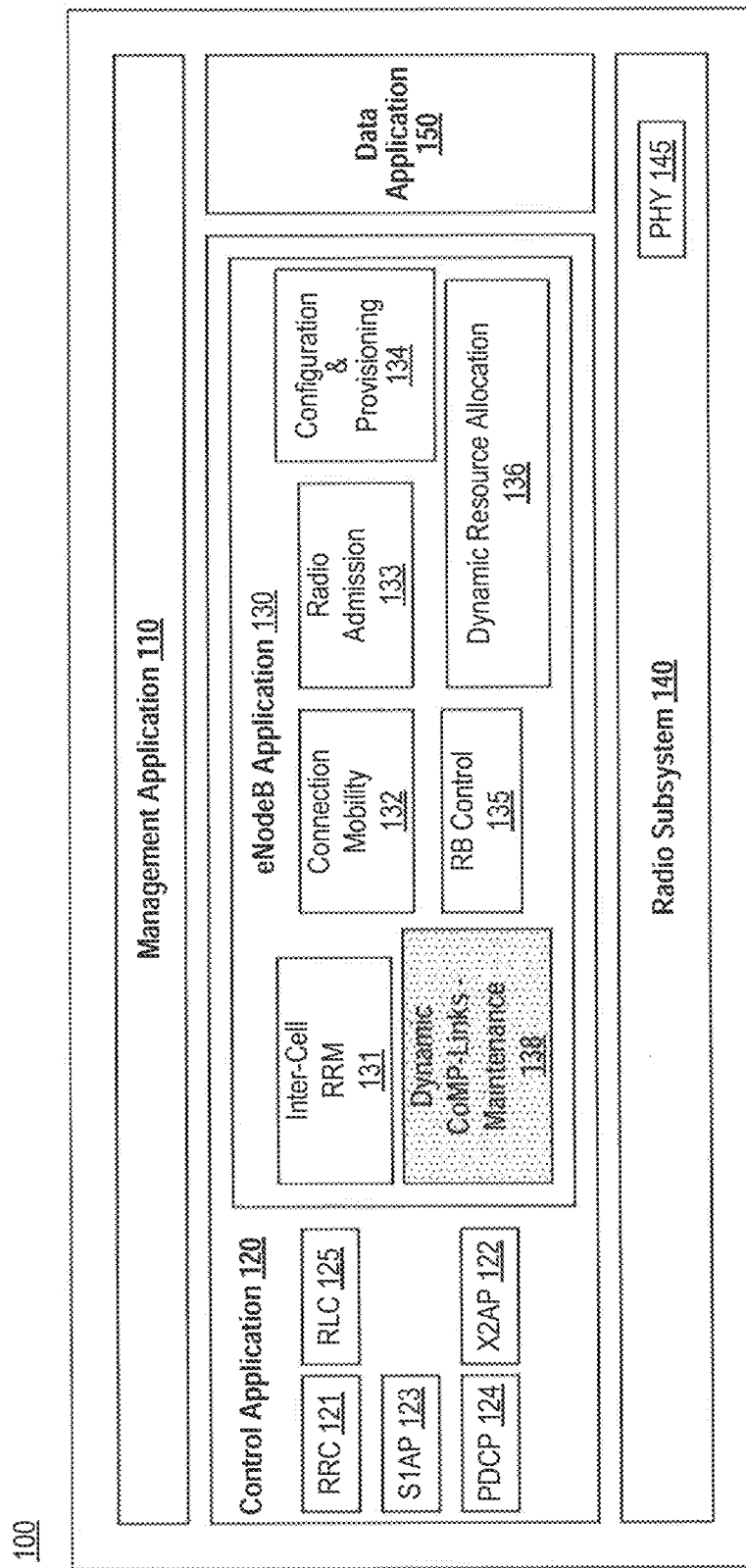
FIG. 1 illustrates an exemplary dynamic CoMP link maintenance system according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

While CoMP links, as described by 3GPP specifications provide added back-up links at cellular edges, the current mechanisms do not provide for CoMP link optimization at an individual user device (user equipment, "UE"). For example, as the CoMP mechanism increases user device service quality at the cell edge, the resource demand of each user device will increase. Accordingly, resource optimization at each user device may all systems to maintain desired service quality for each user device while using a CoMP mechanism.

Moreover, the actual number of users, their service requirements, and their spatial distribution within a base station area may dynamically change over time. Without updates, systems will use outdated information to form CoMP links. Moreover, existing resource planning and/or control mechanisms during the course of network operations and, thus, may not be suitable for managing a CoMP mechanism. Accordingly, disclosed systems address individualized UE resource management, which may take into consideration the set of channels used by a UE.

Disclosed systems and methods may provide an effective CoMP link maintenance mechanism for network resource optimization for each UE, while maintaining the required throughput to a UE at a cell edge. For example, disclosed systems and methods may detect a need for CoMP link maintenance to occur based on UE service quality and base station (BS) load. When the service quality of UE drops below a threshold value, CoMP link maintenance (e.g., CoMP link creation and/or termination) may be triggered. When a BS load exceeds a pre-configured threshold, CoMP links termination may be triggered with that particular BS and a new CoMP link may be associated with a different BS.

Disclosed embodiments may perform CoMP link maintenance while optimizing network resource, such as a physical resource, power optimization, system memory optimization, and/or an X2 link optimization. In order to optimize physical resources and power, disclosed embodiments may merge data bearer channels or perform packet data rate scheduling. For example, a DRB (Data Radio Bearer) may be merged with another in-use CoMP link by releasing the current CoMP link when a required data rate changes. In another example, a scheduling data rate mechanism may associate an optimum number of CoMP links. In order to optimize system memory, disclosed embodiments may monitor and process inactive CoMP links. For example, if a link is inactive for a predefined time, the link may be terminated to release system memory. To optimize X2 links, when a BS directly transmits data received from a network in a downlink through a CoMP link, an X2 link between each BS may be removed.

FIG. 1 illustrates an exemplary dynamic CoMP link architecture 100 according to some embodiments of the present disclosure. Architecture 100 may provide various components to enable dynamic CoMP link maintenance at, for example, an eNodeB.

Architecture 100 may include radio subsystem 140 for physical transmission. For example, radio subsystem 140 may include physical layer 145. Physical layer 145 may be used for communication with UEs. In some embodiments, physical layer 145 may include functionality such as OFDM modulation and coding, resource partitioning, and multiplexing.

Architecture 100 may include control application 120. In some embodiments, control application 120 may include user plane protocols. For example, control application 120 may be responsible for handling and control of user plane protocol messages, such as Packet Data Convergence Protocol (PDCP 124), Radio Link Control (RLC 125), and Medium Access Control (not shown), based on current state of the engine. These protocols may facilitate header compression and encryption of user level IP packets, error recovery and flow control, hybrid automatic repeat request (HARQ), and scheduling.

In some embodiments, control application 120 may include higher level control layer protocols. For example, control application 120 may be responsible for handling control plane protocols, such as Radio Resource Control (RRC 121) and S1 Application Part (S1AP 123), as well as user plane protocols, such as evolved GPRS Tunneling Protocol—User data tunneling messages based on the current state of the engine. These protocols may facilitate session management, security, radio management, and mobility management. For example, RRC 121 may provide connection establishment and connection release, system information broadcast, bearer establishment, and reconfiguration. RRC 121 may also handle RRC mobility procedures, paging notification, and release and outer loop power control.

In some embodiments, control application 120 may include specific components to handle the X2 Application Protocol (X2AP 122). X2AP 122 may be used to handle the UE mobility. For example, X2AP 122 may provide functionality such as mobility management during handover, load management for load balancing, resetting the X2 in the event of failure of system, and setting up the X2 for information transfer among base stations. X2AP 122 may also facility eNodeB configuration updates for updating the changes in the configuration.

In some embodiments, control application 120 may include transport layer protocols. For example, control application 120 may include components to handle Stream Control Transmission Protocol (not shown) to provide in-sequence message transport.

Architecture 100 may include improved eNodeB application 130. eNodeB application may provide node management functions. In some embodiments, eNodeB may include standard functionality, for example using connection mobility 132, radio admission 133, configuration and provisioning 134, radio broadcast control 135, and dynamic resource allocation 136.

In some embodiments, improved eNodeB application may include components to support radio resource management (inter-cell RRM 131). RRM 131 may function as a subset of RRC to manage RRC resources. RRM 131 may perform the necessary measurements configuration for measurement report. RRM 131 also process the measurement report received via RRC 121.

eNodeB application 130 may include dynamic CoMP link maintenance processor 138. Dynamic CoMP link maintenance processor 138 may be introduced inside eNodeB application 130. Dynamic CoMP link maintenance processor 138 may receive CoMP Link related configuration information from Management Application 110 that is gathered and forwarded by eNodeB application 130 during startup of the system. Dynamic CoMP link maintenance processor 138, which is part of eNodeB application 130, may obtain the necessary configuration data and load it into its own persistent memory (e.g., DCLM-PM) for local configuration (LC). Dynamic CoMP link maintenance processor 138 may extract configuration information of neighbor base stations. For example, dynamic CoMP link maintenance processor 138 may extract default CoMP set creation by accessing its DCLM-PM. Dynamic CoMP link maintenance processor 138 may determine, based on the default CoMP set, links to be used for providing service to a UE at a cell edge. Based on the service, Dynamic CoMP link maintenance processor 138 may update configuration information in DCLM-PM. The updated configuration information may be sent by dynamic CoMP link maintenance processor 138 to eNodeB application 130.

Architecture 100 may include management application 110, which will be further discussed in related to FIG. 2 below. Management application 110 may interact with and receive services from management toolkit (not shown).

As discussed above, architecture 100 may include some existing LTE architecture elements. Though, architecture 100 may include additional components that use existing LTE components in new ways.

Figure 2:
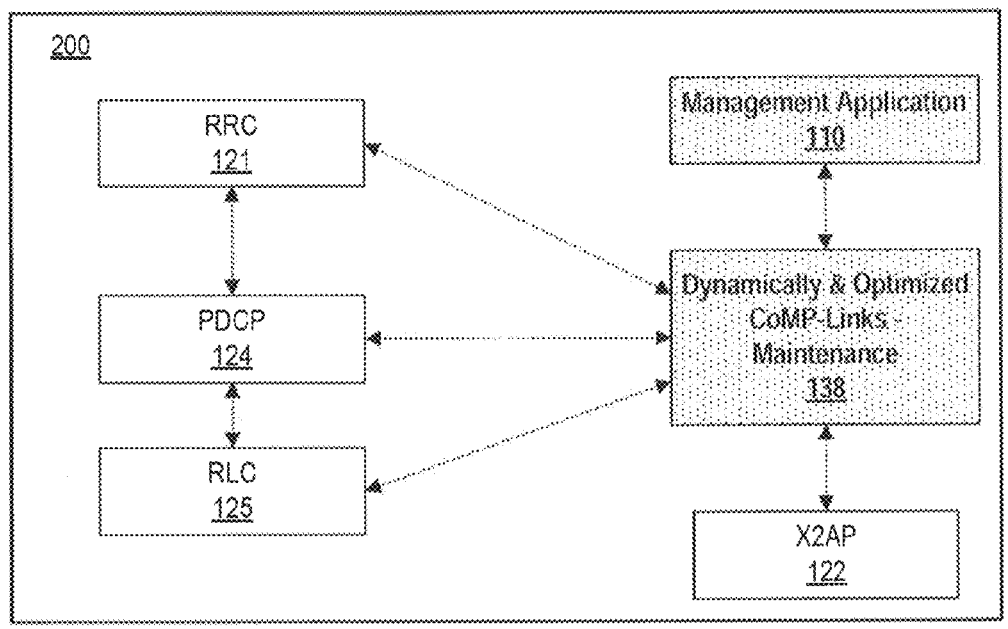
FIG. 2 is a functional block diagram according to some embodiments of the present disclosure.

FIG. 2 is a functional block diagram of system 200 according to some embodiments of the present disclosure. System 200 illustrates how dynamic CoMP link maintenance processor 138 may interact with various components of architecture 100. For example, dynamic CoMP link maintenance processor 138 may predominantly interact with RLC 125, RRC 121, PDCP 124, X2AP 122, and management application 110. These interaction may be facilitated by eNodeB application 130 and/or management interface. Using these resources, dynamic CoMP link maintenance processor 138 may provide a mechanism to maintain CoMP links resulting in seamless service to a UE in a serving base station cell coverage area by multiple neighbor cells.

In an embodiment, dynamic CoMP link maintenance processor 138 may be responsible for maintaining an existing CoMP set (e.g., a CoMP link rearrangement, CoMP scheme rearrangement, tearing down a CoMP link, achieving required maximum achievable data rate (MADR)) for a UE in serving base station cell. Dynamic CoMP link maintenance processor 138 may work with RRM 131, RRC 121, and X2AP 122 to maintain a CoMP set at eNodeB application 130. For initial configuration, dynamic CoMP link maintenance processor 138 may send a message through a configuration API to obtain global configuration parameters from management application 110 through a control process of eNodeB application 130.

Dynamic CoMP link maintenance processor 138 may hold all the configuration related parameters in a local configuration. For example, the local configuration may store a threshold margin for data rate (DR-Marg$_{th}$), Back of Time (BackOff$_{time}$), and Wake Up Time (WakeUp$_{time}$) in persistent memory (e.g., DCLM-PM).

In an embodiment, an exemplary local configuration (LC) may include a threshold margin for data rate (DR-Marg$_{threshold}$). This threshold margin may be used to determine whether the throughput obtained after link maintenance and consolidation falls within the threshold levels of predefined throughput. This threshold margin may be used by calculated throughput validation (e.g., step 330 of FIG. 3 discussed below).

In an embodiment, an exemplary local configuration (LC) may include a threshold BS Load (BSLoad$_{threshold}$). This threshold may be used to determine whether a BS load is above a predefined threshold. When the current load is above the threshold limit, CoMP link maintenance may be used to optimize a network resource for providing service to a UE at cell edge. This parameter may be used by a determine trigger processor (e.g., step 310 of FIG. 3 discussed below).

In an embodiment, an exemplary local configuration (LC) may include a back-off time (BackOff$_{time}$). This time may be used to determine the length of time that must elapse for waiting to maintain the old CoMP links and for processing further triggering decisions for CoMP link maintenance. This parameter may be used for calculated throughput validation (e.g., step 330 of FIG. 3 discussed below).

In an embodiment, an exemplary local configuration (LC) may include wake-up time (WakeUp$_{time}$). This time may be used to define the prior do time elapse while waiting to maintain the new CoMP links and for taking further triggering decision of CoMP link optimization. This parameter may be used for calculated throughput validation (e.g., step 330 of FIG. 3 discussed below).

In an embodiment, an exemplary local configuration (LC) may include a default CoMP links list (CoMPLink$_{Default}$). The list may include default CoMP links received from management application 110 during system Initialization. This list may be used to establish CoMP links with a neighbor base station. This default CoMP link list may be used in determining whether CoMP Links should be changed (e.g., step 320 of process 300 discussed below).

In an embodiment, an exemplary local configuration (LC) may include a CoMP link stale timer (CoMPLinkStale$_{timer}$). This time may be the threshold timer to determine when a particular CoMP link is deemed inactive. For example, when the link is inactive for the predefined stale timer duration, the link may be considered for termination. This timer may be used in determining whether CoMP Links should be changed (e.g., step 320 of process 300 discussed below).

In an embodiment, an exemplary local configuration (LC) may include a threshold channel state indication (CSI) value (CoMPLinkCsiValue$_{Threshold}$). This value may represent the threshold factor for Channel State Indication for determining a NBS to be considered for CoMP link establishment and maintenance. When the CSI falls below the threshold factor, then the NBS may not be considered for a CoMP link. This value may be used is used in determining whether CoMP Links should be changed (e.g., step 320 of process 300 discussed below).

This list of exemplary local configuration parameters is not exhaustive and in no way is meant to be limiting. In some embodiments, other logical configuration parameters may be used.

System 200 may include management application 110. Management application 110 may initially configure system 200 during start-up of the system. Management application 110 may also locally store configuration data in its own persistent memory. In some embodiments, management application 110 may provide the configuration data to dynamic CoMP link maintenance processor 138 for configuration, in addition to providing the data other processors, such as RRC 121, X2AP 122, PDCP 124, and S1AP 123. Management application 110 may update configuration information received from dynamic CoMP link maintenance processor 138 and other components in its own persistent memory and send updated dynamic CoMP link maintenance configuration data for storage. In some embodiments, management application 110 may receive global information for configuring global data specific to a base station during start-up of the system. Management application 110 configure a base station during start-up using the global specific data.

Management application 110 may contain the following data for configuration:

DCLM$_{Config}$: Dynamic CoMP link maintenance (DCLM) configuration data may be used to configure DCLM module. The configuration data may include, for example:
Threshold margin for data rate (DR-Marg$_{threshold}$)
Back off Time (BackOff$_{time}$)
Wake Up Time (WakeUp$_{time}$)
Default CoMP Links List (CoMPLink$_{Default}$)
CoMP link Stale Timer (CoMPLinkStale$_{timer}$)
Threshold Link Replacement Value (CoMPLinkAssesmentValueCLR$_{Threshold}$)
Threshold CSI (CoMPLinkCsiValue$_{Threshold}$).

RRC$_{Config}$: RRC configuration data may be used to configure RRC module. The RRC configuration data may include:
AntennaInfo
CQI-ReportConfig
LogicalChannelConfig
MAC-MainConfig
PDCP-Config
and the like.

RRM$_{Config}$: RRM Configuration data may be used to configure RRM module. The RRM configuration data may include Measurement Configuration.

PDCP$_{Config}$: PDCP configuration data may be used to configure PDCP module.

X2AP$_{Config}$: X2AP configuration data may be used to configure X2AP module.

BS$_{Config}$: Base station configuration data may be used to configure Base Station, such as BS transmission power, BS cell identifier, and BS location, for example.

Figure 3:
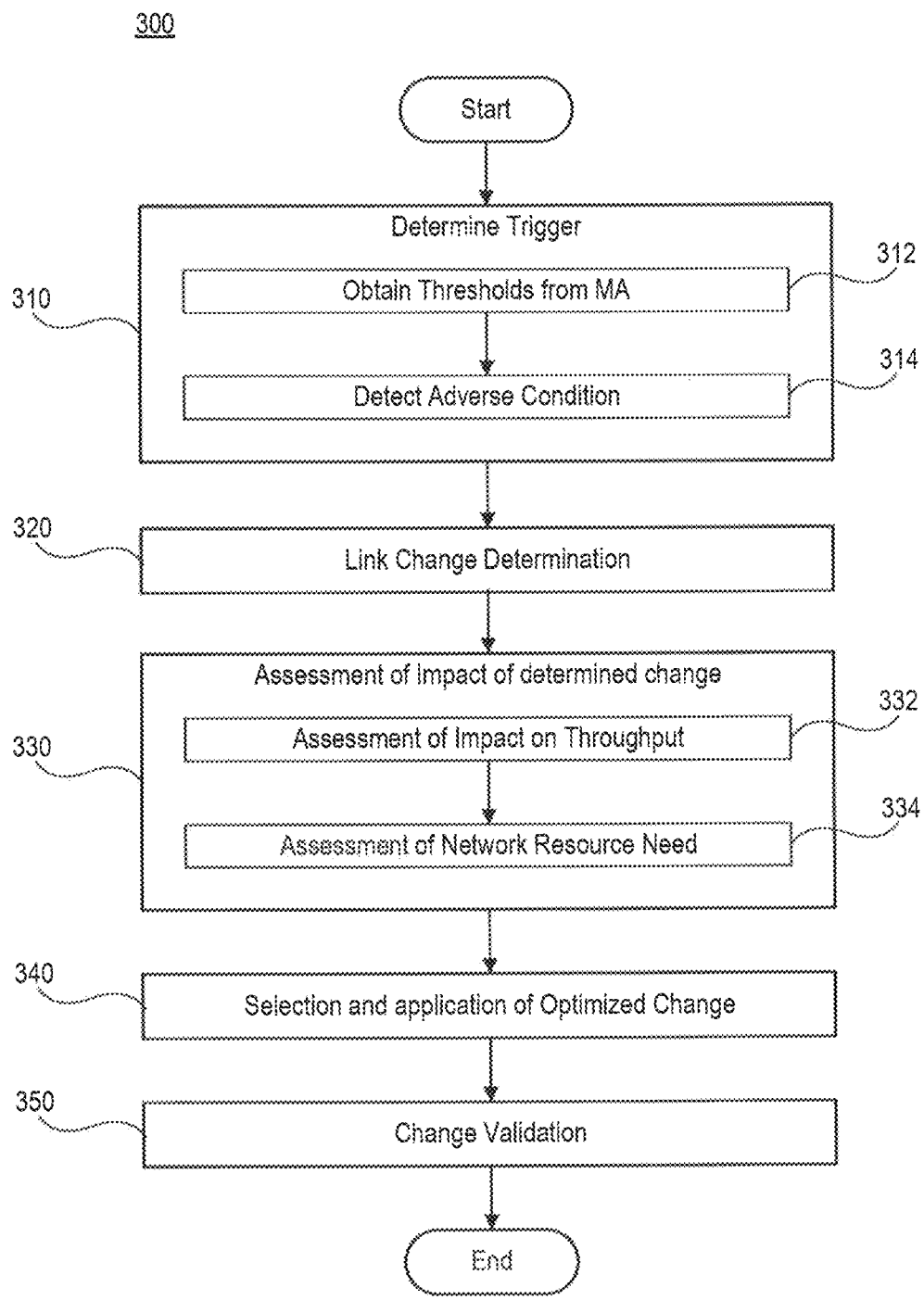
FIG. 3 is a flow diagram illustrating an exemplary adaptive CoMP link maintenance process in accordance with some embodiments of the present disclosure.

FIG. 3 is a flow diagram illustrating an exemplary dynamic CoMP link maintenance process 300 in accordance with some embodiments of the present disclosure. Process 300 may include process steps that actively maintain a CoMP set to achieve maximum data rates. While the steps of process 300 are shown and discussed in a particular order, the steps may be combined or reordered without limit, consistent with the disclosure.

Process 300 may include system initialization. In some embodiments, system 200 may receive receives configuration information of Base Stations (BSs) from Management Application 110 through a communication interface or in-memory data sharing. DCLM 138 may configure the necessary parameters for receiving a UE measurement report of one or more neighbor base stations and SBS-specific configuration parameters in each sector of the serving base station (SBS) network. In an embodiment, DCLM 138 may load a copy of LC from a persistent store (e.g., DCLM-PM) to its memory as "LCM" (LC copy in memory).

In some embodiments, system initialization my include establishing default CoMP links. For example, system 200 may establish CoMP links with between UE and NBS for each CoMP link in a default CoMP link list. In an embodiment, system 200 may start a timer (e.g., CoMPLinkStale$_{timer}$) after establishing the default CoMP links. For example, DCLM 138 may start CoMPLinkStale$_{timer}$ for detecting CoMP link consolidation.

In step 310, system 200 may determine one or more triggers. In an embodiment, system 200 may receive different threshold values for triggering event for CoMP link maintenance for resource optimization. Step 310 may include step 312, in which system 200 may obtain thresholds from MA. For example, system 200 may obtain BS load threshold values BSLoad$_{threshold}$ and obtain DR-Marg$_{threshold}$ for each UE.

Step 310 may include step 314, in which system 200 may detect one or more adverse conditions. For example, system 200 may determine whether current throughput is less than a BS load threshold (e.g., CurrBSload<BSLoadthreshold). When system 200 determines that the BS load exceeds a predetermined threshold, system 200 may, for each UE in a UE list, determine whether current throughput exceeds a threshold margin for data rates (e.g., Curr$_{throughput}$<DR-Marg$_{threshold}$). When system 200 determines that the threshold has been exceeded, process 300 may proceed to step 320. In an embodiment, system 200 may repeat step 314 until all UEs in a UE list have been processed.

In some embodiments, process 300 may include step 320. In step 320, system 200 may perform link change determination (LCD). For example, the LCD process may receive various measurement metrics (e.g., a current data rate on a CoMP link, channel quality of a CoMP link, current UE data buffer, etc.) from different protocol layers of an eNB (e.g., eNodeB application 130). System 200 may then detect whether CoMP links should be changed based on data radio bearer (DRB) merging, X2 link removal, inactive CoMP links, and data scheduling, for example.

In an embodiment, system 200 may perform physical resource bearer usage calculations before and/or after ORB merging. When performing PRB usage calculations before ORB merging, system 200 may count the CoMP links at each UE in a UE list (e.g., COMP$_{count}$(j)=CoMPLink$_{Default}$). For each CoMP link that is counted, system 200 may calculate a number of data radio bearers (ORB) (e.g., DRB$_{num}$ (j,k)) and/or Physical Resource Block (PRB) usage (e.g., PRB$_{usage\_before\_merg}$ (j, k)). System 200 may continue the calculations for each CoMP link at every UE on the UE list When performing PRB usage calculations after ORB merging, system 200 may determine whether a data radio bearer (ORB) may be moved or merged. For example, system 200 may:

---

(i) For each j$_{th}$ UE in UE list (1 <= j <= UE$_{Num}$)
{
(ii) For each m$_{th}$ ORB in DRB$_{num}$ (j, k) (1 <= m<=DRB$_{num}$ (j, k))
    {
    (iii) Check if m$_{th}$ ORB can be moved to any COMP link of

---

-continued

COMP$_{count}$(j));
(iv) Check if ORB can be merged from k$_{th}$ COMP to any other CoMP;
(v) Calculate Physical Resource Block usage PRB$_{usage\_after\_merge}$(j, k);
}
}

---

In an embodiment, system 200 may remove X2 links. The network resource utilization may be optimized by releasing resources of an X2 Link. A BS (SBS or NBS) of a CoMP link may provide an indication explicitly requesting removal (e.g., partial tear down) of a logical link over X2. For example, network resource utilization (e.g., X2Net$_{Resource}$) may be calculated as:

X2Net$_{Resource}$=NBS_context+X2APLink_MA+
    X2Link_Resources*T

Where X2Net$_{Resource}$ calculates the required resource utilization for an X2 link set up or maintenance. In this equation, T may represent the time duration of the active X2 link duration. NBS_context may represent system memory required for maintain context data for logical X2 Link. X2APLink_MA may represent the resources required for maintaining X2 link. System 200 may calculate non-usage time for CoMP links based on CoMP link movement. For example, system 200 may perform the following steps:

---

(i) For each NBS$_j$ (j <=NBS_Num) {
(ii)    Calculate the Non Usage time Time$_{nu}$ based on CoMP Link
        movement decision;
(iii)   If (Time$_{nu}$ >= CoMPLinkStale$_{timer}$) then take decision for X2
        link termination;
(iv)    Store X2 link information for deactivation where necessary in
        a Map< NBS$_j$, deact$_j$>;
(v)     Calculate network resource system memory
        usageX2Net$_{Resource}$ (j);
}

--- in an embodiment, system 200 may identify inactive CoMP links. For example, system 200 may iterate through each CoMP link of each UE on a UE list. For each CoMP link, system 200 may determine whether a stale link time (e.g., COMP$_{LinkStaletimer}$) has expired. To analyze expired CoMP links, system 200 may count the number of terminable CoMP links based on system memory resource constraints. For example, system 200 may perform the following steps:

---

(i) For each jth UE in UE list (1 <= j <= UE$_{Num}$)
{
(ii) For each k$_{th}$ COMP Links (1 <= k <= COMPcount(j))
    {
    (iii) if CoMP$_{LinkStaletimer}$ has been expired, decide for termination of
    CoMP link:
    (iv) Calculate System Memory Resource free
    CoMPInact$_{Resource}$(k);
    (v) Calculate Total CoMPInact$_{Resource}$ =
    $\Sigma_{k=1}^{COMPcount}$ CoMPInactResource;
    (vi) Count Terminable CoMP links CoMP$_{term}$
    }
(vii) Calculate System Memory Usage SysMEM$_{usage\_Inact}$(COMP$_{count}$ -
CoMP$_{term}$);
}

---

In an embodiment, system 200 may perform data scheduling. System 200 may determine whether the CSI value of a given CoMP link exceeds a CSI threshold (e.g., CoM- PLinkCsiValue$_{Threshold}$). For example, for each CoMP link of each UE on a UE list, system 200 may use CoMP links that exceed the threshold CSI value for data scheduling. For CoMP links that fall below the threshold, system 200 may determine and/or label such links as not available for data scheduling. In an embodiment, system 200 may count the number of CoMP links that are not available for scheduling (e.g., as COMP$_{count\_inap}$(j)). For the links that do not exceed the threshold and may be available, system 200 may determine whether the throughput required for the UE (e.g., per UE subscription requirements, TP$_{Qos}$) may be accommodated. When the required throughput can be accommodated, system 200 may schedule the data in the available CoMP links, calculate the physical resource block usage (e.g., PRB$_{usage\_after\_data\_scheduling}$(j,k)), and calculate the power usage for active CoMP links (e.g., Power$_{usage\_after\_data\_scheduling}$(j,k)). When the required throughput cannot be accommodated by the available CoMP links, system 200 may wait for a predetermined period of time to elapse (e.g., CoMPLinkStale$_{timer}$) and recheck the CoMP links for the UE at issue. In an embodiment, system 200 may repeat these steps analyzing the CoMP links for each UE on the UE list.

In step 330, system 200 may assess the impact of the determined change (e.g., the changes from step 320). System 200 may receive link change determination information for throughput calculation. After a CoMP links change is identified, system 200 may calculate UE throughput served by the modified CoMP links. In an embodiment, step 330 may include step 332 where system 200 may iterate through each UE on the UE list to determine the resulting throughput from the link changes identified in step 320. For example, system 200 may perform the following steps:

(i) For each j$_{th}$ UE in UE list (1 <= j <= UE$_{Num}$) {
(ii)  Calculate throughput TP$_{drb\_merge}$ obtained after DRB merging;
(iii) Calculate throughput TP$_{links\_rem}$ obtained after CoMP links removal;
(iv)  Calculate throughput TP$_{data\_sch}$ obtained after data scheduling
(v)   Calculate total throughput TP$_{calc\_total}$ = TP$_{drb\_merge}$ + TP$_{links\_rem}$ + TP$_{data\_sch}$ ;
(vi)  if (TP$_{Qos}$ − DR-Marg$_{threshold}$<TP$_{calc\_total}$<= TP$_{Qos}$ + DR-Marg$_{threshold}$) {
(vii)    Start WakeUp$_{time}$ ;
(viii)   Apply changes from step 320 and go to step 340;
         }
(ix)  Else {
(x)      Start BackOff$_{time}$ for maintain old CoMP links;
         }
}

In step 330, system 200 may assess network resources. For example, in step 334, system 200 may determine whether the assessed BS load (e.g., AssessBS$_{load}$) is less than the current BS load (e.g., CurrBS$_{load}$). When the assessed BS is less than the current BS load, system 200 may proceed to step 340. When the assessed load is greater than the current load, system 200 may start a timer (e.g., BackOff$_{time}$) for maintaining old CoMP links.

In step 340, system 200 may select and apply the optimized changes from step 320 and step 330. System 200 may receive various link resource optimizations metrics from step 320. System 200 may then compute the different resources utilized and saved for different resource optimization scenarios. For example, system 200 may calculate physical resource usage, system memory usage, and power usage.

In an embodiment, system 200 may calculate physical resource usage by extracting physical resource block (PRB) usage for DRB merging (e.g., PRB$_{usage\_after\_merge}$) and packet data scheduling (e.g., PRB$_{usage\_after\_data\_scheduling}$). System 200 may calculate a total PRB usage by summing the PRB usage for packet data scheduling and PRB usage after merging. System 200 may calculate the total PRB usage for each UE in a UE list (e.g., PRB$_{Total(i)}$).

In an embodiment, system 200 may calculate system memory usage by extracting system memory usage for inactive CoMP links (e.g., SysMEM$_{usage\_inact}$) and system memory usage for X2 link usage (e.g., X2Net$_{Resource}$). System 200 may calculate total system memory usage (e.g., Sys MEM$_{Total}$) by summing SysMEM$_{usage\_inact}$ and X2Net$_{Resource}$. System 200 may calculate the total system memory usage for each UE in a UE list.

In an embodiment, system 200 may calculate power usage for each UE. For example, system 200 may extract Power usage after data scheduling in CoMP links (e.g., Power$_{usage\_after\_data\_scheduling}$). System 200 may calculate the power usage for each UE in a UE list.

In step 350, system 200 may validate UE changes. System 200 may receive calculated PRB, system memory, and/or power utilization from step 340 for each UE. System 200 may check the effective resource saving for the proposed methods. For example, system 200 may validate PRB optimization, system memory optimization, and power optimization.

In an embodiment, system 200 may validate physical resource block optimization. For each UE in a UE list, system 200 may extract PRB usage (e.g., PRB$_{Total}$) for CoMP link maintenance. System 200 may calculate PRB$_{Total\_default}$ for all CoMP links without CoMP links maintenance. When system 200 determines that PRB$_{Total}$ is less than PRB$_{Total\_default}$, system 200 may continue with CoMP link maintenance. Otherwise, process 300 may return to step 320.

In an embodiment, system 200 may validate system memory optimization. For each UE in a UE list, system 200 may extract memory usage (e.g., SysMEM$_{Total}$) for CoMP link maintenance). System 200 may calculate SysMEM$_{Total\_default}$ for all CoMP links without CoMP link maintenance. System 200 may determine whether SysMEM$_{Total}$ is less than SysMEM$_{Total\_default}$. When system 200 determines that SysMEM$_{Total}$ is less than SysMEM$_{Total\_default}$, system 200 proceeds with CoMP link maintenance. When system 200 determines that SysMEM$_{Total}$ is equal to or exceeds SysMEM$_{Total\_default}$, process 300 may return to step 320.

In an embodiment, system 200 may validate power optimization. For each UE in a UE list, system 200 may extract power usage (e.g., Power$_{usage\_after\_data\_scheduling}$) for CoMP link maintenance. System 200 may calculate total power (e.g., Power$_{Total\_default}$) for all CoMP links without CoMP link maintenance. System 200 may compare power usage after data scheduling (e.g., Power$_{usage\_after\_data\_scheduling}$) with Power$_{Total\_default}$. When system 200 determines that power usage after data scheduling is less than total default power, system 200 may continue with CoMP link maintenance. When system 200 determines that Power$_{usage\_after\_data\_scheduling}$ is equal to or exceeds Power$_{Total\_default}$, process 300 may return to step 320.

Figure 4:
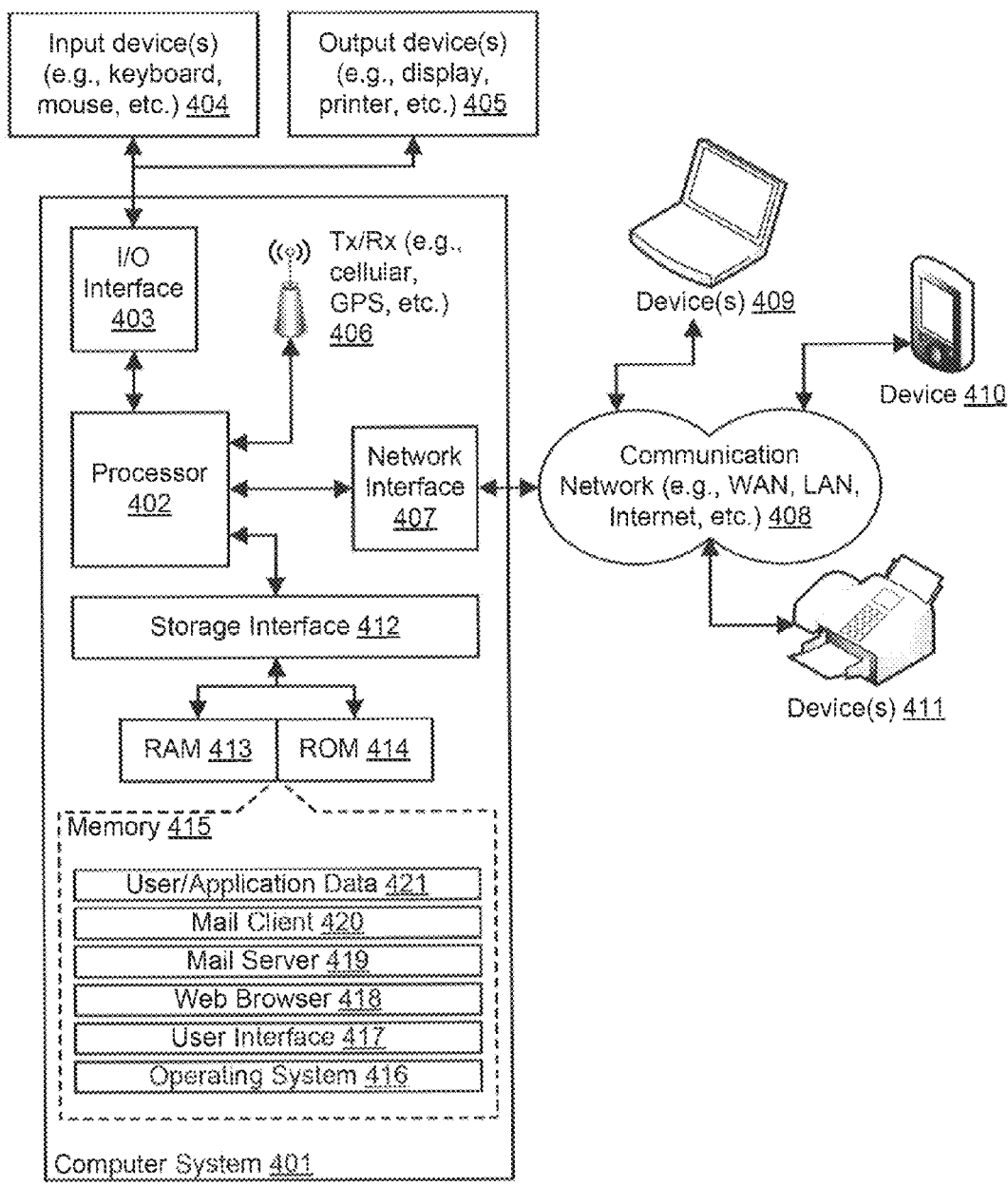
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing the devices and systems disclosed herein. Computer system 401 may comprise a central processing unit ("CPU" or "processor") 402. Processor 402 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8 Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interlace may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.) tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases disclosed herein.

The memory devices may store a collection of program or database components, including, without limitation, an operating system 416, user interface application 417, web browser 418, mail server 419, mail client 420, user/application data 421 (e.g., any data variables or data records discussed in this disclosure, such as the CoMP link lists or associate variables), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface application 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described methods and systems for dynamic CoMP-link maintenance. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an" and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM) volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for dynamic coordinated multi-point link maintenance, comprising:
    a hardware processor; and
    a memory storing instructions executable by the hardware processor for:
        detecting, via the hardware processor, a trigger for coordinated multi-point link maintenance;
        identifying, via the hardware processor, one or more potential changes to one or more coordinated multi-point links;
        estimating, via the hardware processor, a coordinated multi-point link throughput based on the one or more potential changes to the one or more coordinated multi-point links;
        calculating, via the hardware processor, one or more resource utilization metrics based on the one or more potential changes to the one or more coordinated multi-point links; and
        determining, via the hardware processor, whether to implement the one or more potential changes to the one or more coordinated multi-point links based on the estimated coordinated multi-point link throughput and the one or more resource utilization metrics.

2. The system of claim 1, wherein detecting the trigger for coordinated multi-point link maintenance comprises at least one of:
    determining, via the hardware processor, that a current base station load is less than a base station load threshold, or
    determining, via the hardware processor, that a current user equipment throughput is less than a user equipment throughput threshold.

3. The system of claim 1, wherein the identified one or more potential changes to the one or more coordinated multi-point links include at least one of: data bearer merging; packet data rate rescheduling, system memory optimization, or removal or termination of an X2 Link.

4. The system of claim 1, wherein the one or more calculated resource utilization metrics include at least one of: physical resource usage, system memory usage, or power usage.

5. The system of claim 4, wherein determining whether to implement the one or more potential changes to the one or more coordinated multi-point links comprises:
    determining, via the hardware processor, whether the estimated coordinated multi-point link throughput lies within a predetermined throughput range.

6. The system of claim 4, wherein determining whether to implement the one or more potential changes to the one or more coordinated multi-point links comprises:
    determining, via the hardware processor, whether the physical resource usage is less than a physical resource usage threshold;
    determining, via the hardware processor, whether the system memory usage is less than a system memory usage threshold; and
    determining, via the hardware processor, whether the power usage is less than a power usage threshold.

7. The system of claim 1, the memory further storing instructions for:
    modifying, via the hardware processor, a coordinated multi-point link set for a user equipment based on the identified one or more potential changes to the one or more coordinated multi-point links, after determining to implement the one or more potential changes to the one or more coordinated multi-point links.

8. A method for dynamic coordinated multi-point link maintenance, comprising:
   detecting, via a hardware processor, a trigger for coordinated multi-point link maintenance;
   identifying, via the hardware processor, one or more potential changes to one or more coordinated multi-point links;
   estimating, via the hardware processor, a coordinated multi-point link throughput based on the one or more potential changes to the one or more coordinated multi-point links;
   calculating, via the hardware processor, one or more resource utilization metrics based on the one or more potential changes to the one or more coordinated multi-point links; and
   determining, via the hardware processor, whether to implement the one or more potential changes to the one or more coordinated multi-point links based on the estimated coordinated multi-point link throughput and the one or more resource utilization metrics.

9. The method of claim 8, wherein detecting the trigger for coordinated multi-point link maintenance comprises at least one of:
   determining, via the hardware processor, that a current base station load is less than a base station load threshold, or
   determining, via the hardware processor, that a current user equipment throughput is less than a user equipment throughput threshold.

10. The method of claim 8, wherein the identified one or more potential changes to the one or more coordinated multi-point links include at least one of: data bearer merging; packet data rate rescheduling, system memory optimization, or removal or termination of an X2 Link.

11. The method of claim 8, wherein the one or more calculated resource utilization metrics include at least one of: physical resource usage, system memory usage, or power usage.

12. The method of claim 11, wherein determining whether to implement the one or more potential changes to the one or more coordinated multi-point links comprises:
   determining, via the hardware processor, whether the estimated coordinated multi-point link throughput lies within a predetermined throughput range.

13. The method of claim 11, wherein determining whether to implement the one or more potential changes to the one or more coordinated multi-point links comprises:
   determining, via the hardware processor, whether the physical resource usage is less than a physical resource usage threshold;
   determining, via the hardware processor, whether the system memory usage is less than a system memory usage threshold; and
   determining, via the hardware processor, whether the power usage is less than a power usage threshold.

14. The method of claim 8, further comprising:
   modifying, via the hardware processor, a coordinated multi-point link set for a user equipment based on the identified one or more potential changes to the one or more coordinated multi-point links, after determining to implement the one or more potential changes to the one or more coordinated multi-point links.

15. A non-transitory computer-readable medium storing instructions that, when executed by a hardware processor, cause the processor to perform a method comprising:
   detecting, via the hardware processor, a trigger for coordinated multipoint link maintenance;
   identifying, via the hardware processor, one or more potential changes to one or more coordinated multi-point links;
   estimating, via the hardware processor, a coordinated multi-point link throughput based on the one or more potential changes to the one or more coordinated multi-point links;
   calculating, via the hardware processor, one or more resource utilization metrics based on the one or more potential changes to the one or more coordinated multi-point links; and
   determining, via the hardware processor, whether to implement the one or more potential changes to the one or more coordinated multi-point links based on the estimated coordinated multi-point link throughput and the one or more resource utilization metrics.

16. The non-transitory computer-readable medium of claim 15, wherein detecting the trigger for coordinated multi-point link maintenance comprises at least one of:
   determining, via the hardware processor, that a current base station load is less than a base station load threshold, or
   determining, via the hardware processor, that a current user equipment throughput is less than a user equipment throughput threshold.

17. The non-transitory computer-readable medium of claim 15, wherein the identified one or more potential changes to the one or more coordinated multi-point links include at least one of: data bearer merging; packet data rate rescheduling, system memory optimization, or removal or termination of an X2 Link.

18. The non-transitory computer-readable medium of claim 15, wherein the one or more calculated resource utilization metrics include at least one of: physical resource usage, system memory usage, or power usage.

19. The non-transitory computer-readable medium of claim 18, wherein determining whether to implement the one or more potential changes to the one or more coordinated multi-point links comprises:
   determining, via the hardware processor, whether the estimated coordinated multi-point link throughput lies within a predetermined throughput range.

20. The non-transitory computer-readable medium of claim 18, wherein determining whether to implement the one or more potential changes to the one or more coordinated multi-point links comprises:
   determining, via the hardware processor, whether the physical resource usage is less than a physical resource usage threshold;
   determining, via the hardware processor, whether the system memory usage is less than a system memory usage threshold; and
   determining, via the hardware processor, whether the power usage is less than a power usage threshold.

* * * * *